United States Patent
Vanderwilt et al.

(10) Patent No.: US 8,054,336 B2
(45) Date of Patent: Nov. 8, 2011

(54) HIGH DEFINITION PAN TILT ZOOM CAMERA WITH EMBEDDED MICROPHONES AND THIN CABLE FOR DATA AND POWER

(75) Inventors: Patrick D. Vanderwilt, Austin, TX (US); Michael L. Kenoyer, Austin, TX (US); William V. Oxford, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1033 days.

(21) Appl. No.: 11/119,584

(22) Filed: May 2, 2005

(65) Prior Publication Data

US 2006/0082655 A1   Apr. 20, 2006

Related U.S. Application Data

(60) Provisional application No. 60/619,227, filed on Oct. 15, 2004.

(51) Int. Cl.
*H04N 5/232* (2006.01)
(52) U.S. Cl. .................................. 348/211.14
(58) Field of Classification Search .................. 348/143, 348/211.1
See application file for complete search history.

(56) References Cited

U.S. PATENT DOCUMENTS

| | | |
|---|---|---|
| 4,264,928 A | 4/1981 | Schober |
| 5,034,947 A | 7/1991 | Epps |
| 5,054,021 A | 10/1991 | Epps |
| 5,374,971 A | 12/1994 | Clapp et al. |
| 5,486,853 A | 1/1996 | Baxter et al. |
| 5,515,099 A | 5/1996 | Cortjens et al. |
| 5,528,289 A | 6/1996 | Cortjens et al. |
| 5,537,157 A | 7/1996 | Washino et al. |
| 5,598,209 A | 1/1997 | Cortjens et al. |
| 5,612,733 A | 3/1997 | Flohr |
| 5,617,539 A | 4/1997 | Ludwig et al. |
| 5,633,681 A | 5/1997 | Baxter et al. |
| 5,657,096 A | 8/1997 | Lukacs |
| 5,689,641 A | 11/1997 | Ludwig et al. |
| 5,692,159 A | 11/1997 | Shand |

(Continued)

FOREIGN PATENT DOCUMENTS

JP   2000197151   7/2000

OTHER PUBLICATIONS

Notice of Allowance of Sep. 22, 2008, in U.S. Appl. No. 11/251,083, 15 pages.

(Continued)

*Primary Examiner* — James Hannett
(74) *Attorney, Agent, or Firm* — Meyertons Hood Kivlin Kowert & Goetzel, P.C.; Jeffrey C. Hood (57) ABSTRACT

In various embodiments, a High Definition (HD) camera may be controlled by one or more motors in a base of the HD camera. Cables and other components may be used to manipulate the HD camera lens through the side arms of the HD camera. Putting the motors in the base may reduce the size of the outer case of the HD camera and add stability. In some embodiments, images from the HD camera may be converted into a serialized stream and transported over a cable from the HD camera. Other components may also be used to increase the functionality of the HD camera.

18 Claims, 6 Drawing Sheets

U.S. PATENT DOCUMENTS

| | | | |
|---|---|---|---|
| 5,737,011 | A | 4/1998 | Lukacs |
| 5,737,431 | A | 4/1998 | Brandstein et al. |
| 5,751,338 | A | 5/1998 | Ludwig, Jr. |
| 5,764,277 | A | 6/1998 | Loui et al. |
| 5,821,987 | A | 10/1998 | Larson |
| 5,896,128 | A | 4/1999 | Boyer |
| 6,072,522 | A | 6/2000 | Ippolito et al. |
| 6,124,892 | A | 9/2000 | Nakano |
| 6,356,308 | B1 | 3/2002 | Hovanky |
| 6,587,823 | B1 | 7/2003 | Kang et al. |
| 6,590,604 | B1 | 7/2003 | Tucker et al. |
| 6,593,956 | B1 * | 7/2003 | Potts et al. ........... 348/14.09 |
| 6,594,688 | B2 | 7/2003 | Ludwig et al. |
| 6,643,462 | B2 * | 11/2003 | Harand et al. ........... 396/379 |
| 6,724,619 | B2 | 4/2004 | Kwong et al. |
| 6,731,334 | B1 * | 5/2004 | Maeng et al. ........... 348/211.12 |
| 6,809,358 | B2 * | 10/2004 | Hsieh et al. ........... 257/291 |
| 6,816,904 | B1 | 11/2004 | Ludwig et al. |
| 6,822,507 | B2 | 11/2004 | Buchele |
| 6,850,025 | B1 * | 2/2005 | Paolantonio et al. ........ 318/685 |
| 6,850,265 | B1 | 2/2005 | Strubbe et al. |
| 6,912,178 | B2 | 6/2005 | Chu et al. |
| D510,589 | S | 10/2005 | Andre et al. |
| 6,980,485 | B2 | 12/2005 | McCaskill |
| 7,012,630 | B2 | 3/2006 | Curry et al. |
| 7,038,709 | B1 | 5/2006 | Verghese |
| 7,046,295 | B2 | 5/2006 | Hovanky |
| 7,130,428 | B2 | 10/2006 | Hirai et al. |
| 7,202,904 | B2 * | 4/2007 | Wei ........... 348/373 |
| 7,339,605 | B2 | 3/2008 | Rodman et al. |
| 7,397,495 | B2 | 7/2008 | Girish et al. |
| 2002/0154210 | A1 * | 10/2002 | Ludwig et al. ........... 348/14.08 |
| 2002/0191082 | A1 * | 12/2002 | Fujino et al. ........... 348/211.14 |
| 2003/0103770 | A1 | 6/2003 | Arbuckle |
| 2004/0001137 | A1 | 1/2004 | Cutler et al. |
| 2004/0183897 | A1 | 9/2004 | Kenoyer et al. |
| 2004/0257432 | A1 * | 12/2004 | Girish et al. ........... 348/14.08 |
| 2005/0212908 | A1 | 9/2005 | Rodman et al. |
| 2005/0262201 | A1 | 11/2005 | Rudolph et al. |
| 2006/0013416 | A1 * | 1/2006 | Truong et al. ........... 381/119 |
| 2006/0034469 | A1 | 2/2006 | Tamiya et al. |
| 2006/0104458 | A1 | 5/2006 | Kenoyer et al. |
| 2006/0104633 | A1 | 5/2006 | Kenoyer et al. |
| 2006/0165242 | A1 | 7/2006 | Miki et al. |
| 2006/0238611 | A1 | 10/2006 | Kenoyer et al. |
| 2006/0256983 | A1 | 11/2006 | Kenoyer et al. |
| 2006/0269278 | A1 | 11/2006 | Kenoyer et al. |
| 2007/0053681 | A1 | 3/2007 | Arbuckle |
| 2007/0182819 | A1 * | 8/2007 | Monroe ........... 348/143 |

OTHER PUBLICATIONS

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages (reference states last updated Feb. 3, 2004).

Peter Klein; "Video Workplace Conference"; IEEE Proceedings of Globecom; 1985 (month unknown); pp. 109-112; Siemens AG, Germany.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; "Microsoft Array project in MSR: approach and results", http://research.microsoft.com/users/ivantash/ Documents/MicArraysInMSR.pdf; Jun. 2004; 49 pages.

"Press Releases"; Retrieved from the Internet: http://www.acousticmagic.com/press/, Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

Office Action of Mar. 19, 2008 in U.S. Appl. No. 11/251,083, 20 pages.

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Peter Meyers; "Adding Eye Contact to Your Web Chats"; The New York Times; Sep. 4, 2003; 5 pages.

"Polycom Executive Collection"; Jun. 2003; 4 pages; Polycom, Inc.; Pleasanton, CA.

Machine translation of JP 2000197151, 11 pages, Jul. 14, 2000.

* cited by examiner

FIG. 6 they may be too large and too difficult to control for a video conferencing system. It may not be possible to place a HD camera on top of a display monitor as part of a conference system.

HIGH DEFINITION PAN TILT ZOOM CAMERA WITH EMBEDDED MICROPHONES AND THIN CABLE FOR DATA AND POWER

PRIORITY

This application claims priority to U.S. Provisional Patent Application Ser. No. 60/619,227 titled "High Definition Camera and Mount", which was filed Oct. 15, 2004, whose inventors are Michael L. Kenoyer, Patrick D. Vanderwilt, Paul D. Frey, Paul Leslie Howard, Jonathan I. Kaplan, and Branko Lukic.

BACKGROUND OF THE INVENTION

1. Field of the Invention

The present invention relates generally to cameras and, more specifically, to video cameras.

2. Description of the Related Art

Video conference calling may allow participants to see other participants in the call using video connections (e.g., between cameras/monitors). Video conferencing systems may use cameras to capture images of conference participants at one site to transmit and display to conference participants at another site. Some conference systems may place the camera on top of the video monitor that is displaying the other participants. Because the participants in the conference will probably be facing the video monitor, the placement of the camera on top of the video monitor may allow conference participants to speak during the conference without needing to face a different direction to have their video captured. Because cameras in video conference systems may be placed on top of video monitors in the video conference system, the size of the camera used may be limited. For example, high definition (HD) cameras provide high definition images, but they may be too large and too difficult to control for a video conferencing system. It may not be possible to place a HD camera on top of a display monitor as part of a conference system.

Traditionally, a tilt motor on the HD camera may be used in a rotating head of the HD camera structure and coupled to a lens/sensor assembly on the HD camera. A panning mechanism on the HD camera may need to overcome inertia of not only the lens/sensor assembly, but also the inertia of the tilt motor and linkage in the rotating head of the HD camera. In addition, traditional HD cameras may use thick cables to send analog signals (which may be susceptible to noise).

SUMMARY OF THE INVENTION

In various embodiments, a High Definition (HD) camera may have a lens portion and a base portion coupled to each other through one or more arm portions. The HD camera may be controlled by one or more motors in the HD camera's base. A tilt motor in the HD camera base may control the tilt of the HD camera, while a pan motor in the HD camera base may pan the HD camera. The tilt and pan motors may be coupled to plates in the base of the HD camera. The tilt motor may also be coupled to cables in an arm portion of the HD camera.

Putting the motors in the base may reduce the size of the outer case of the HD camera and add stability. In some embodiments, images from the HD camera may be converted into a serialized digital stream and transported over a data cable from the lens through a center shaft of the HD camera. This may allow the placement of several components for processing images, etc. in a base of the camera instead of in the lens portion. Other information may also be sent over the data cable (e.g., bi-directional control data and power). Other components in the lens portion and/or base portion may also be used to increase the functionality of the HD camera.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE INVENTION

Incorporation By Reference

U.S. Provisional Patent Application Ser. No. 60/619,303, titled "Speakerphone", which was filed Oct. 15, 2004, whose inventors are Michael L. Kenoyer, William V. Oxford, and Simon Dudley is hereby incorporated by reference in its entirety as though fully and completely set forth herein.

U.S. Provisional Patent Application Ser. No. 60/619,212, titled "Video Conferencing Speakerphone", which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application Ser. No. 60/619,227, titled "High Definition Camera and Mount", which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

U.S. Provisional Patent Application Ser. No. 60/619,210, titled "Video Conference Call System", which was filed Oct. 15, 2004, whose inventors are Michael J. Burkett, Ashish Goyal, Michael V. Jenkins, Michael L. Kenoyer, Craig B.

Malloy, and Jonathan W. Tracey is hereby incorporated by reference in its entirety as though fully and completely set forth herein.

Figure 1:
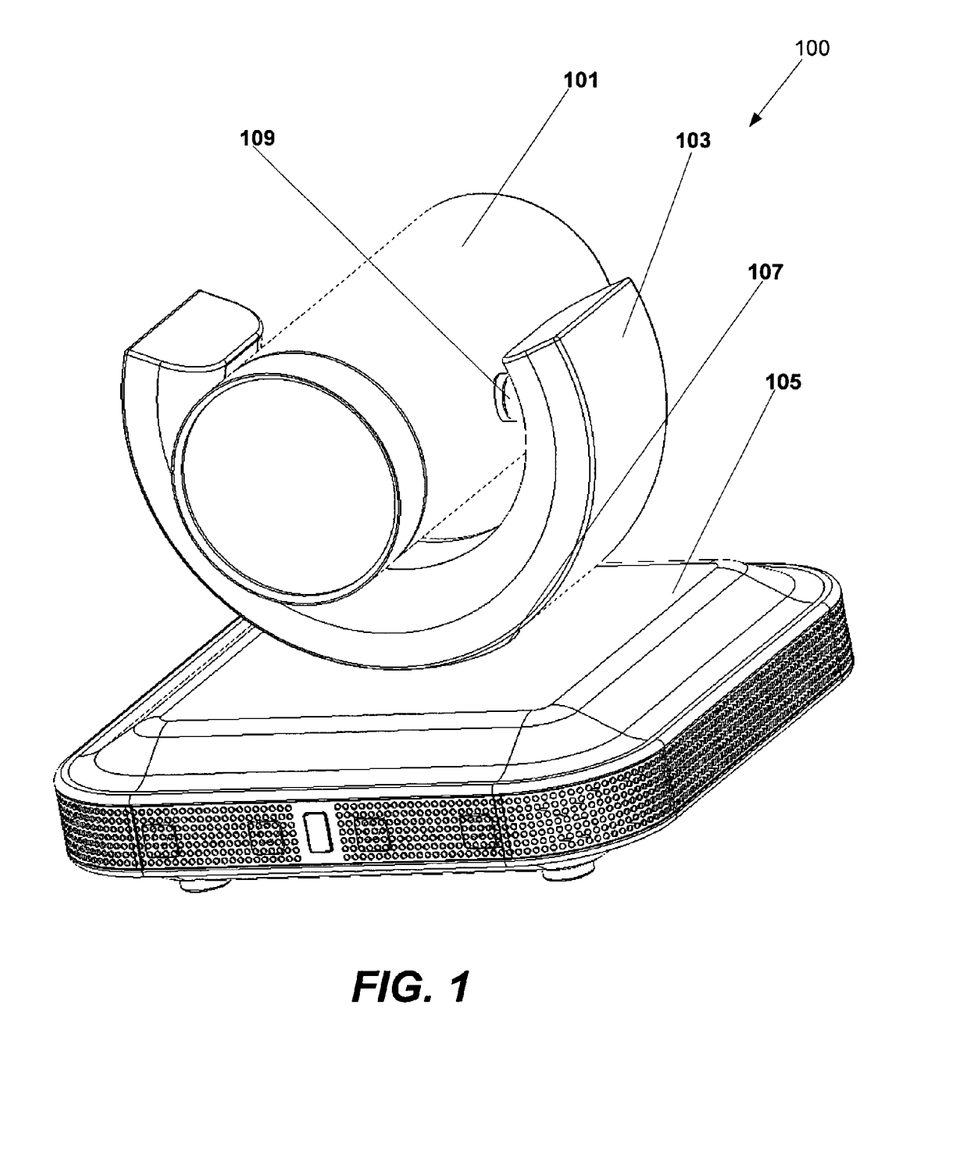
FIG. 1 illustrates an outer casing of a HD pan, tilt, zoom (PTZ) camera, according to an embodiment.

FIG. 1 illustrates a HD pan, tilt, zoom (PTZ) camera 100, according to an embodiment. In some embodiments, the HD PTZ camera 100 may be used to provide video of participants during a video conference call. In some embodiments, the HD PTZ camera 100 may be a companion HiDef pan-tilt-zoom camera with a resolution of 1280×720 at 30 frames per second (fps). Other cameras, resolutions, and frame rates are also contemplated.

In some embodiments, the HD PTZ camera 100 may have a lens portion 101 coupled to a base 105 by one or more arm portions (e.g., camera bracket arms 103). In some embodiments, the lens portion 101 may be panned and/or tilted by motors in the base 105. The lens portion 101 may be pointed towards a participant or another source of visual interest. In some embodiments, the lens portion 101 may be panned by a motor turning the base shaft 107. In some embodiments, the lens portion 101 may be tilted by a motor turning a rod 109. In some embodiments, the pan motor and the tilt motor may be in the base of the HD PTZ camera 100. Other locations of the pan and tilt motors are also contemplated. In some embodiments, one motor may be used for panning and tilting the HD PTZ camera 100. In some embodiments, multiple motors may be used for panning and/or tilting the HD PTZ camera. In some embodiments, an electromechanical motor may be used. Other motors are also contemplated.

Figure 2:
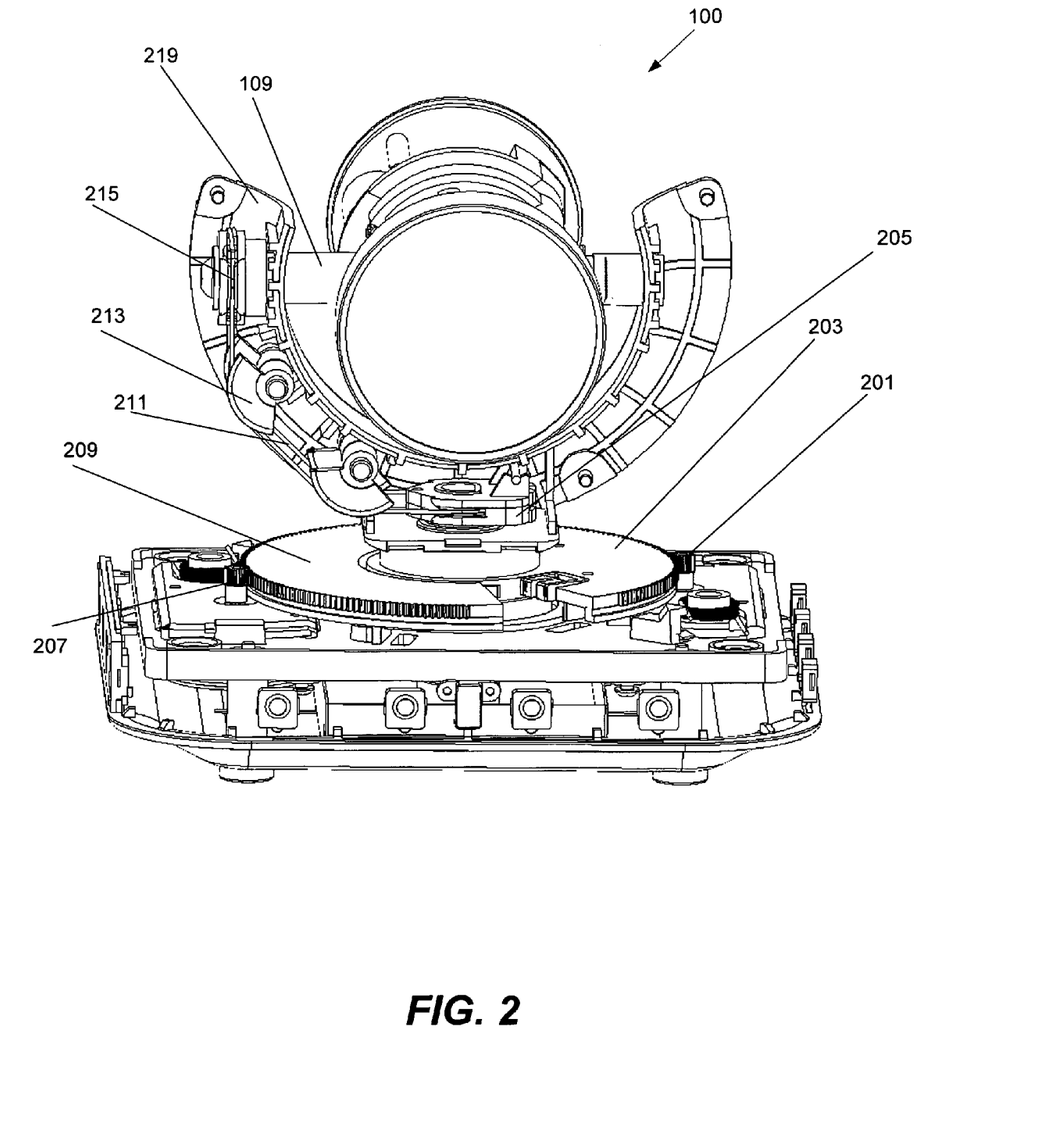
FIG. 2 illustrates a cutaway front view of a HD PTZ camera, according to an embodiment.

FIG. 2 illustrates a cutaway view of a HD PTZ camera 100, according to an embodiment. Pan motor 201 and tilt motor 207 may substantially control movement of the HD PTZ camera 100. In some embodiments, the pan motor 201 and/or tilt motor 207 may be in the base of the HD PTZ camera 100. Putting the motors in the base may reduce the size of the outer case of the HD PTZ camera 100 and add stability. Pan motor 201 may rotate a first plate 203 that may pan the HD PTZ camera 100 to the left or right. In some embodiments, the pan motor 201 may turn a gear with teeth that interlock with teeth on the plate 203 to rotate the HD PTZ camera 100 through a range of motion (e.g., 180 degrees) left to right. In some embodiments, a larger or smaller range of motion may be implemented. Other sizes of plates 203 may also be used. For example, a larger plate may allow a larger range of motion.

In some embodiments, a tilt motor 207 may turn a second plate 209 using a gear with teeth that interlock with teeth on the second plate 209. The second plate 209 may turn a cable wheel 205 that may pull cable 211 in to the left or right (depending on which way the plate 209 is rotated). The cable 211 may rotate a tilt wheel 215 that may turn a rod 109 to tilt the HD PTZ camera 100 in the up and down direction. Offsetting connectors 213 with grooves for the cable 211 may hold the cable 211 away from the side of the interior of the HD PTZ camera 100 while also allowing the cable 211 to move back and forth along the interior of the HD PTZ camera bracket arm 219. While two sets of offsetting connectors 213 are shown, other numbers of offsetting connectors 213 may also be used.

Figure 3:
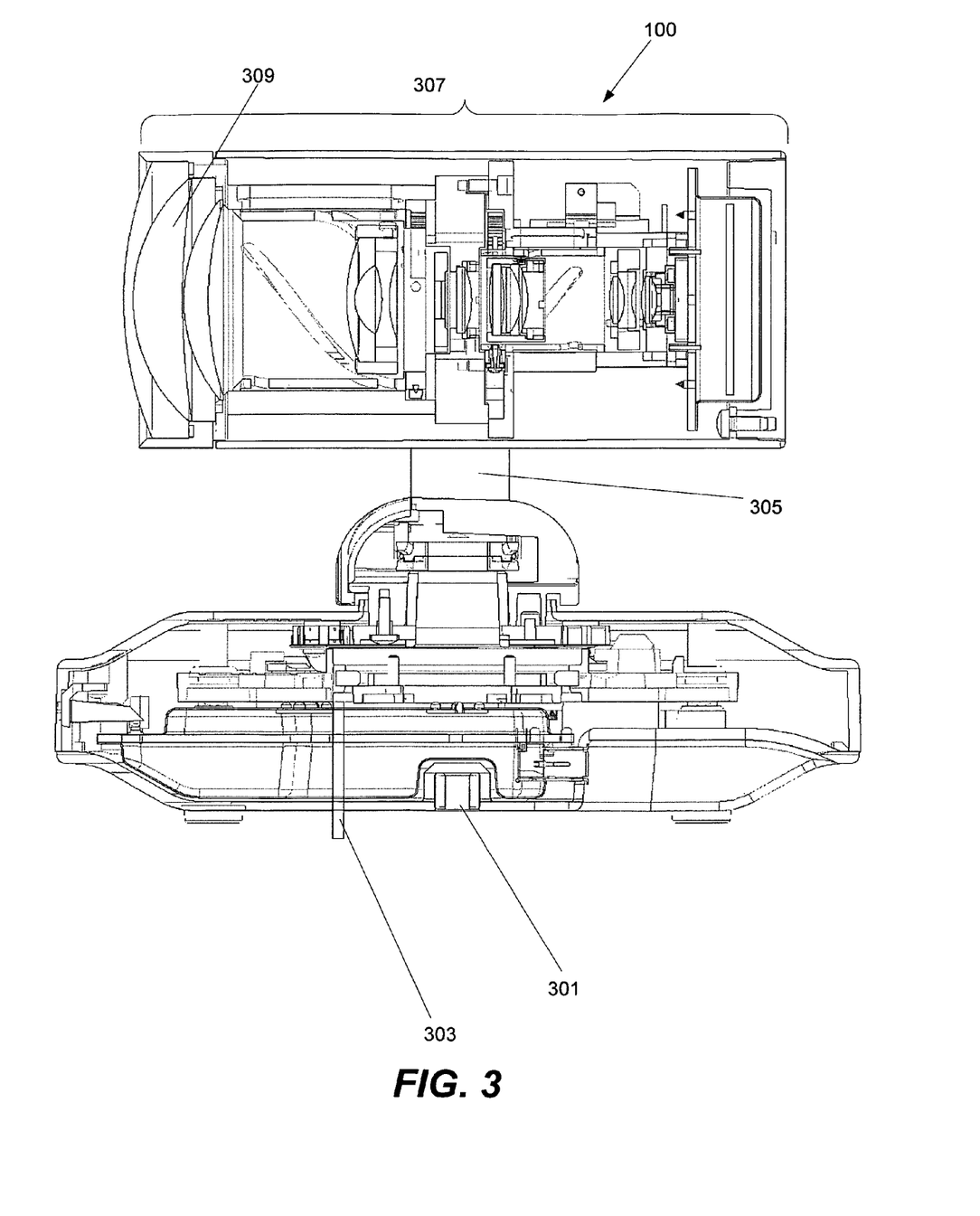
FIG. 3 illustrates a side view of the internal components of the HD PTZ camera, according to an embodiment.

FIG. 3 illustrates a side view of the internal components of the HD PTZ camera 100, according to an embodiment. In some embodiments, a screw hole 301 for a tripod mount screw may be provided. The HD PTZ camera 100 may attach to a mount through the tripod mount screw (other fasteners are also contemplated).

In some embodiments, the HD PTZ camera 100 may use a wide angle lens 309 to capture an image of a participant even at a close angle. A data cable 303 may provide a link for data to and from the HD PTZ camera 100. In some embodiments, the signal from the HD PTZ camera 100 may be digitized before being sent down the data cable 303 in a high speed serial digital stream. Other data types and conversions are also contemplated. For example, an industry standard electrical (Low Voltage Differential Signaling (LVDS)) and/or mechanical (e.g., Firewire/IEEE1394) interface may be used. In some embodiments, the data cable 303 may be thin and flexible. The data cable 303 may provide a digital interface to the HD PTZ camera 100 with, for example, six wires from the HD PTZ camera 100 to the HD PTZ camera base. Other numbers of wires may also be used. In some embodiments, the data cable 303 may form a high speed digital bus for carrying digitized microphone data, digital image data, bi-directional control data for controlling pan, tilt, focus, zoom motors, iris motors, and/or power to the HD PTZ camera 100. Because the data is in digital form, there may be no loss of signal quality over long distances (e.g., approximately 25 feet or longer). Digital repeaters may be used to extend the distance further than 25 feet. In addition, the digital signal may not need to be compressed. In some embodiments, a standard may be used for the digital data stream. In addition, the digital signal may be able to travel further with more power to the signal. In some embodiments, the data cable 303 may be up to 50 feet long. Other lengths are also contemplated.

In some embodiments, the data cable 303 may run up one of the arms 305 of the HD PTZ camera 100 to the central components of the lens portion 307. In some embodiments, the data cable 303 may run up the other arm 305 that does not contain the tilt cable 211. In some embodiments, the data cable 303 may not run up an arm of the camera. For example, the data cable 303 may terminate in the base of the camera to a Printed Wiring Board (PWB) containing control electronics. In some embodiments, a different cable may connect the PWB to the camera head 307. In some embodiments, the different cable may have a different construction than the data cable 303, but may include similar elements (e.g., power, digital video signals, control signals, etc) as data cable 303. In some embodiments, the different cable may have a similar construction (e.g., be made of similar wires, similar number of signal lines, etc.).

In some embodiments, the wide angle lens 309 may capture wide angle views without a wide field adapter. The captured view may be clearer and have less distortion without the wide field adapter. In some embodiments, the wide angle lens may allow for 70 degrees and greater fields of view. Other fields of view are also contemplated. In some embodiments, a wide field adapter may be used.

Figure 4:
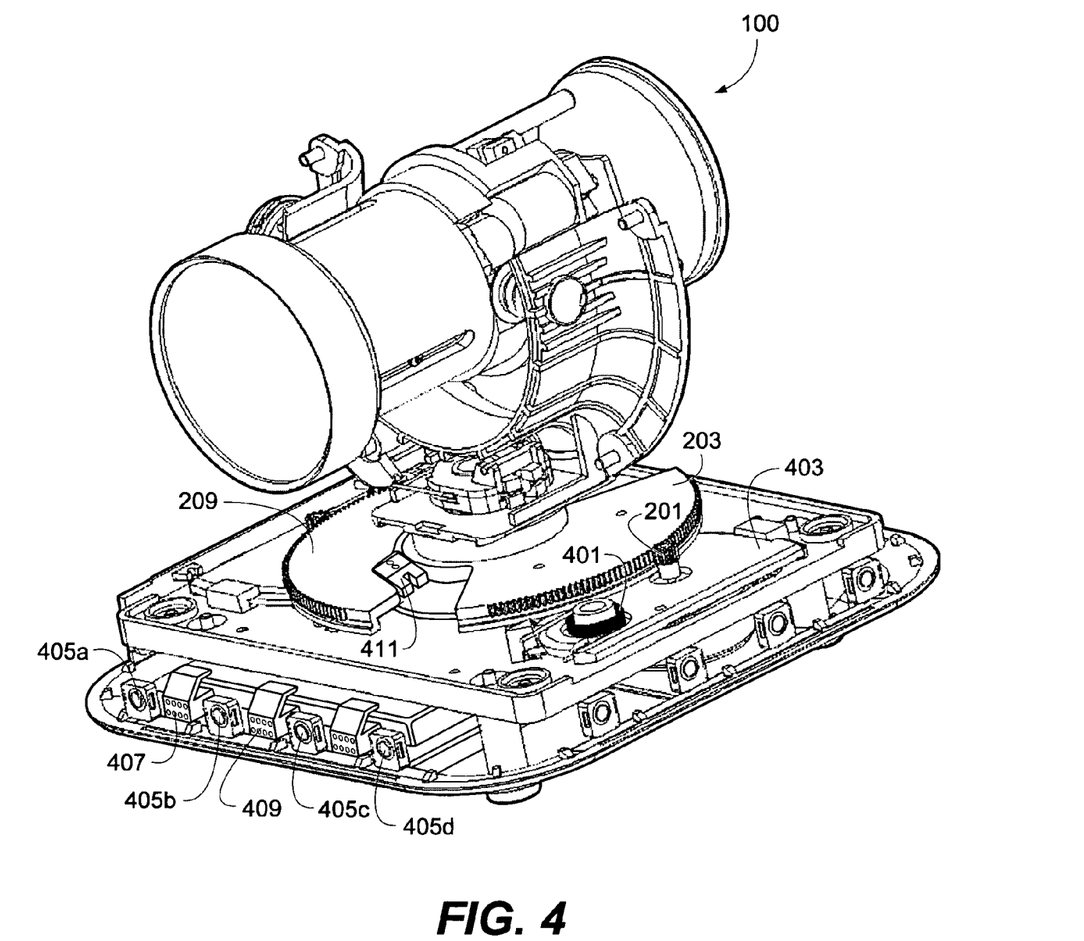
FIG. 4 illustrates another view of the internal components of the HD PTZ camera, according to an embodiment.

FIG. 4 illustrates another view of the internal components of the HD PTZ camera 100, according to an embodiment. In some embodiments, an opto-interrupter on the gear plate 203 may be used to stop panning or tilting of the HD PTZ camera 100 if the HD PTZ camera 100 is panned or tilted past a predefined point. In some embodiments, additional opto-interrupters (e.g., 411) may be put on the other gear plate 209. In some embodiments, the opto-interrupters may be put on both sides of each gear plate to detect when the HD PTZ camera 100 was rotated or tilted past each end of a predefined point. In some embodiments, a spring 401 may bias the motor support plate 403 toward the center of the HD PTZ camera 100. This bias may keep the motor gear 201 in contact with the gear plate 203.

In various embodiments, an array of microphones 405 may be used to point the HD PTZ camera 100 in the direction of a speaking participant. The signals from the microphones 405 may be beamformed to determine the direction of arrival. The HD PTZ camera 100 may then be aimed at a participant or another source of audio. In some embodiments, eight low noise microphones 405 may be integrated into the HD PTZ camera 100. Other numbers of microphones and other microphone array orientations may be used. In some embodiments, the HD PTZ camera 100 may not have microphones (e.g., it may be steered by a user). Digitized microphone data may be sent down the data cable 303.

In some embodiments, the location or angle of a participant relative to the HD PTZ camera 100 may be determined by beamforming data from the microphones 405. The microphone positions relative to the HD PTZ camera 100, along with the angle and zoom of the HD PTZ camera 100 may be known or determined by the system. The microphone positions, camera angle, and camera zoom may then be used in conjunction with the data from the microphones 405 to determine the angle of the participant relative to the true visual field of the HD PTZ camera 100. In some embodiments, the spatial positioning of the participant relative to the visual field may be determined and the HD PTZ camera 100 may be steered/aimed to center on the participant (or may be steered to another predetermined angle and zoom relative to the participant). Other uses of audio directional information may also be used. For example, the audio directional information may be used to provide stereo or psuedo-stereo audio on a far-end video conference system. For example, the audio from a participant to the right of the camera's direction of view may be provided out a right-hand speaker of a far-end video conference system monitor.

In some embodiments, a remote control sensor 407 may be provided. In some embodiments, multiple remote control sensors may be provided to make it easier for the HD PTZ camera 100 to receive signals from a remote control. In some embodiments, the HD PTZ camera 100 may receive signals through the remote control sensor 407 from a remote control. The remote control signals may be relayed through cable 303 to a video conference system. Additional connectors may also be provided. In some embodiments, light-pipe 409 may be provided (e.g., for a light emitting diode (LED) on a circuit board behind the light-pipe 409). The LED may be used to indicate when a signal is received from the remote control or may be illuminated when the HD PTZ camera 100 is powered. Other uses for the LED are also contemplated.

Figure 5:
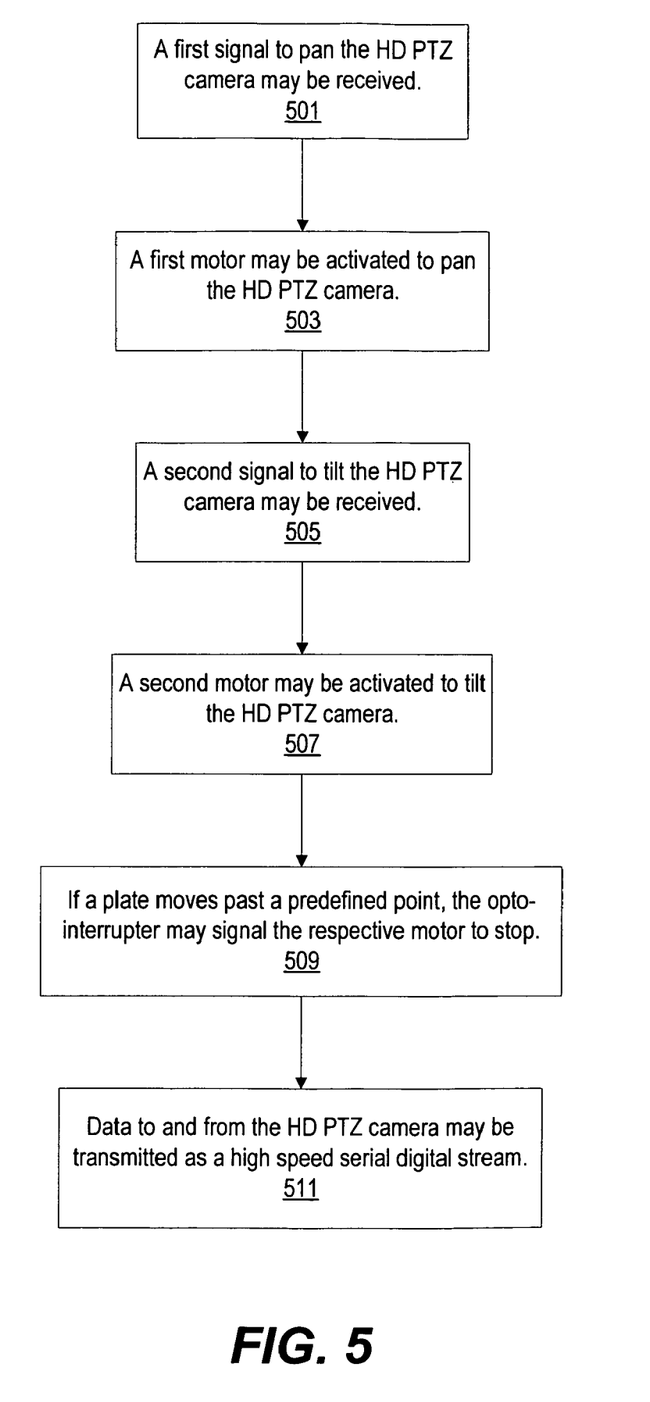
FIG. 5 illustrates a method of positioning an HD PTZ camera, according to an embodiment.

FIG. 5 illustrates a method of positioning an HD PTZ camera 100, according to an embodiment. It is noted that in various embodiments one or more of the method elements may be performed concurrently, in a different order, or be omitted. Additional elements may be performed as desired.

At 501, a first signal to pan the HD PTZ camera 100 may be received.

At 503, a first motor (e.g., pan motor 201) may be activated to pan the HD PTZ camera 100. In some embodiments, the first motor may pan the HD PTZ camera 100 through rotation of a first plate 203 coupled to the HD PTZ camera 100.

At 505, a second signal to tilt the HD PTZ camera 100 may be received.

At 507, a second motor (e.g., tilt motor 207) may be activated to tilt the HD PTZ camera 100. In some embodiments, the second motor may tilt the HD PTZ camera 100 through rotation of a second plate 209 coupled to the HD PTZ camera 100 through cables in an arm of the HD PTZ camera 100.

At 509, if the first plate 203 or the second plate 209 moves past a predefined point (as detected by an opto-interrupter), the opto-interrupter 411 may signal the first motor or the second motor, respectively, to stop.

At 511, data to and from the HD PTZ camera 100 may be transmitted as a high speed serial digital stream through a thin cable coupled to the HD PTZ camera 100.

Figure 6:
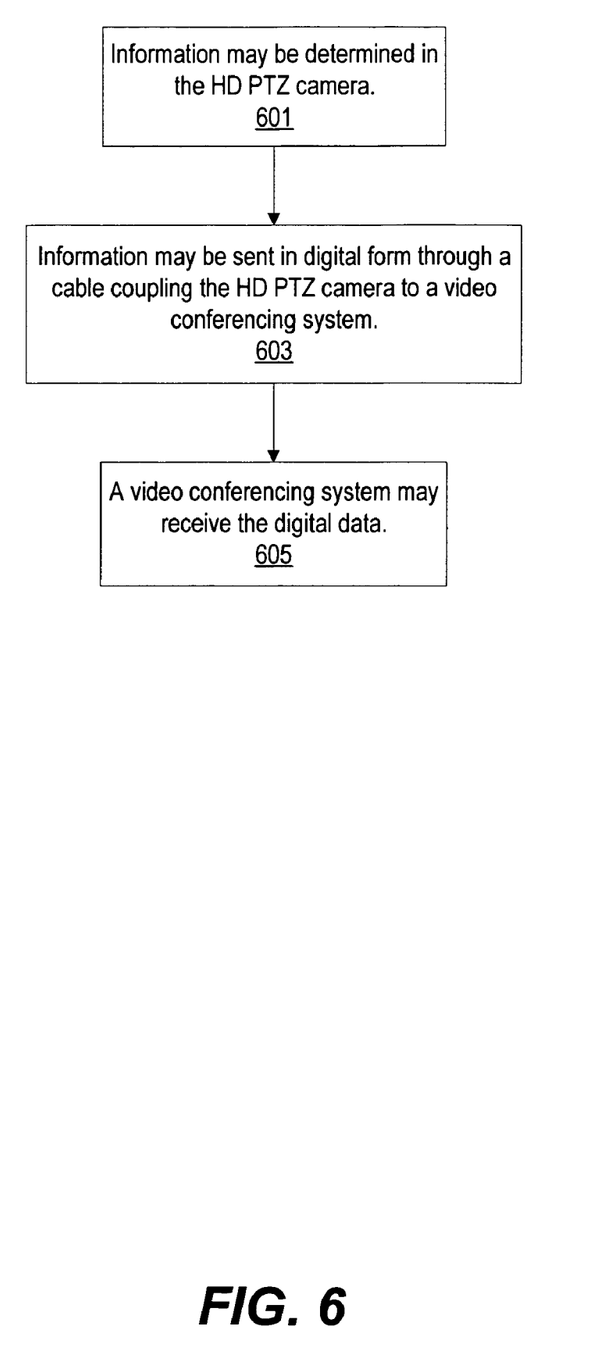
FIG. 6 illustrates a method of receiving information from an HD PTZ camera 100, according to an embodiment.

FIG. 6 illustrates a method of receiving information from an HD PTZ camera 100, according to an embodiment. It is noted that in various embodiments one or more of the method elements may be performed concurrently, in a different order, or be omitted. Additional elements may be performed as desired.

At 601, information may be determined in the HD PTZ camera 100. For example, information may include a visual image detected through the lens of the HD PTZ camera, microphone data (e.g., used in beamforming), or other data.

At 603, information may be sent in digital form through a cable coupling the HD PTZ camera to a video conferencing system. In some embodiments, the information may be digitized in the HD PTZ camera 100 prior to being sent. In some embodiments, the information may not need to be digitized prior to being sent (e.g., information may already be in digital form). In some embodiments, information may be sent using another means besides a cable (e.g., through a wireless transmission).

At 605, a video conferencing system may receive the digital data.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for use at a first endpoint of a video conference, the apparatus comprising:
   a high definition (HD) camera at the first endpoint, comprising;
      a lens portion; and
      a base portion coupled to the lens portion;
   wherein the lens portion is operable to serialize image data detected through the lens portion and send the serialized image data to the base portion;
   wherein the base portion comprises one or more components for processing the serialized image data;
   wherein the base portion of the HD camera is coupled by a data cable to a first video conferencing device that is located at the first endpoint, wherein the first video conferencing device is configured to communicate with one or more other endpoints of the video conference to receive image information from the one or more other endpoints and use the image information in generating a videoconference display signal for display at the first endpoint;
   wherein the base portion of the HD camera is configured to send digital data on the data cable to the first video conferencing device that is located at the first endpoint, wherein the digital data sent from the base portion of the HD camera through the data cable includes at least a portion of the serialized image data received from the lens portion, wherein the first video conferencing device is configured to send the at least a portion of the serialized image data to the one or more other endpoints of the video conference;

wherein the base portion of the HD camera is further configured to receive digital data sent on the data cable from the first video conferencing device that is located at the first endpoint.

2. The apparatus of claim 1, wherein the data cable is greater than 25 feet in length.

3. The apparatus of claim 2, wherein the data cable receives power to power the HD camera.

4. The apparatus of claim 1, wherein the data cable sends and receives bi-directional control data for controlling one or more of pan, tilt, focus, zoom motors, and iris motors.

5. The apparatus of claim 1, wherein the data cable sends and receives digitized data from one or more microphones.

6. The apparatus of claim 1, further comprising a digital repeater coupled to the data cable.

7. The apparatus of claim 1, further comprising a wide angle lens coupled to the HD camera, wherein the wide angle lens does not include a wide field adapter.

8. The apparatus of claim 7, wherein the wide angle lens captures greater than approximately a 60 degree field of view.

9. The apparatus of claim 1, wherein the digital data is sent according to a standard.

10. The apparatus of claim 1, wherein the digital data is uncompressed.

11. The apparatus of claim 1, further comprising:
an array of microphones comprised in the HD camera, wherein the array of microphones is used to detect a direction to a sound source.

12. The apparatus of claim 11, wherein the detection of the direction to the sound source is used to aim the HD camera.

13. The apparatus of claim 1, further comprising a remote control sensor coupled to the HD camera, wherein the base portion of the HD camera is further configured to relay remote control signals received by the remote control sensor to the first video conferencing device through the data cable.

14. The apparatus of claim 1, wherein the HD camera is operable to steer the lens portion based on control signals generated internal to the HD camera.

15. The apparatus of claim 1, wherein the HD camera further comprises one or more arm portions coupling the lens portion to the base portion.

16. A high definition (HD) camera for use at a first endpoint of a video conference, the HD camera comprising:
a lens portion;
a base portion coupled to the lens portion;
an array of microphones comprised on the HD camera, wherein the array of microphones is usable to detect a direction to a sound source relative to a visual field of the HD camera;
wherein the HD camera is configured to steer the lens portion based on control signals generated internal to the HD camera, wherein the control signals are based on the detection of the direction to the sound source;
wherein the base portion of the HD camera is coupled by a data cable to a first video conferencing device that is located at the first endpoint, wherein the first video conferencing device is configured to communicate with one or more other endpoints of the video conference to receive image information from the one or more other endpoints and use the image information in generating a videoconference display signal for display at the first endpoint;
wherein the base portion of the HD camera is configured to send digital data on the data cable to the first video conferencing device that is located at the first endpoint, wherein the digital data sent from the base portion of the HD camera through the data cable includes at least a portion of the serialized image data received from the lens portion, wherein the first video conferencing device is configured to send the at least a portion of the serialized image data to the one or more other endpoints of the video conference;
wherein the base portion of the HD camera is further configured to receive digital data sent on the data cable from the first video conferencing device that is located at the first endpoint.

17. The HD camera of claim 16, wherein steering the lens portion of the HD camera is not based on control signals received by the HD camera from the first video conferencing device.

18. The HD camera of claim 16, wherein the array of microphones is comprised on the base portion of the HD camera.

* * * * *